United States Patent
Petters et al.

(10) Patent No.: US 12,079,151 B2
(45) Date of Patent: Sep. 3, 2024

(54) METHOD, COMMUNICATION SYSTEM AND SYSTEM FOR SECURE COMMUNICATION BETWEEN A MASTER AND A SLAVE OF A BUS SYSTEM

(71) Applicant: Baumueller Nuernberg GmbH, Nuremberg (DE)

(72) Inventors: Maximilian Petters, Nuremberg (DE); Daniel Bachmann, Grafengehaig (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 57 days.

(21) Appl. No.: 17/711,117

(22) Filed: Apr. 1, 2022

(65) Prior Publication Data
US 2022/0229797 A1    Jul. 21, 2022

Related U.S. Application Data

(63) Continuation of application No. PCT/EP2020/076392, filed on Sep. 22, 2020.

(30) Foreign Application Priority Data

Oct. 1, 2019   (DE) .................... 10 2019 215 115.9

(51) Int. Cl.
| | | |
|---|---|---|
| *G06F 16/38* | (2019.01) | |
| *G05B 19/408* | (2006.01) | |
| *G05B 19/418* | (2006.01) | |
| *G06F 13/38* | (2006.01) | |
| *G06F 21/60* | (2013.01) | |
| *H04L 12/403* | (2006.01) | |
| *H04L 12/40* | (2006.01) | |

(52) U.S. Cl.
CPC ......... *G06F 13/38* (2013.01); *G05B 19/4185* (2013.01); *G06F 21/606* (2013.01); *H04L 12/403* (2013.01); *G05B 2219/31135* (2013.01); *H04L 2012/4026* (2013.01)

(58) Field of Classification Search
CPC ... G06F 13/38; G06F 21/606; G05B 19/4185; G05B 2219/31135; H04L 12/403; H04L 2012/4026
USPC ........................................................ 709/208
See application file for complete search history.

(56) References Cited

U.S. PATENT DOCUMENTS

| | | |
|---|---|---|
| 6,532,508 B2 | 3/2003 | Heckel et al. |
| 10,466,670 B2 | 11/2019 | Kalberer et al. |
| 2003/0154056 A1* | 8/2003 | Ito .................... G05B 21/02 |
| | | 702/188 |
| 2011/0022205 A1 | 1/2011 | Nakayama |

(Continued)

FOREIGN PATENT DOCUMENTS

| | | | |
|---|---|---|---|
| DE | 19928517 A1 | 1/2001 | |
| DE | 102014001462 A1 * | 8/2015 | ......... G05B 19/0425 |
| WO | WO-2018046556 A1 * | 3/2018 | ......... G05B 19/0423 |

OTHER PUBLICATIONS

Machine translation of DE Patent 102014001462-A1 (Year: 2015).*

*Primary Examiner* — Ruolei Zong (57) ABSTRACT

A method for secure communication between a master and a slave of a bus system includes exchanging a telegram between the master and the slave. The telegram has a first region and a second region. The first region contains a predefined instruction. The second region is filled at least in part with a free instruction. A communication system and a system or an industrial system are also provided.

11 Claims, 4 Drawing Sheets

(56) References Cited

U.S. PATENT DOCUMENTS

| | | | |
|---|---|---|---|
| 2015/0094988 A1* | 4/2015 | Schumacher | G05B 23/0221 |
| | | | 702/188 |
| 2015/0154136 A1* | 6/2015 | Markovic | H04L 63/062 |
| | | | 710/317 |
| 2015/0318867 A1 | 11/2015 | Wiley | |
| 2016/0050122 A1 | 2/2016 | Cortes Gomez et al. | |
| 2017/0185059 A1* | 6/2017 | Kalberer | G05B 19/054 |
| 2017/0212490 A1* | 7/2017 | Hellmann | G05B 19/048 |
| 2018/0027071 A1* | 1/2018 | Toepke | H04L 67/1095 |
| | | | 709/217 |
| 2018/0259479 A1* | 9/2018 | Yoshikawa | G01N 27/4163 |
| 2019/0369599 A1* | 12/2019 | Oberheim | G05B 19/0428 |
| 2021/0081346 A1* | 3/2021 | Nixon | H04L 69/08 |
| 2021/0281666 A1* | 9/2021 | Beckhoff | H04L 49/9057 |

* cited by examiner

| Function | Bit | Low byte | | | | | | | | High byte | | | | | | | | Description |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | |
| STO | | 0 | x | x | x | x | x | x | x | x | x | x | x | x | x | x | x | 0: enable \| 1: disable |
| SS1_1 | | x | 0 | x | x | x | x | x | x | x | x | x | x | x | x | x | x | 0: enable \| 1: disable |
| SS2_1 | | x | x | 0 | x | x | x | x | x | x | x | x | x | x | x | x | x | 0: enable \| 1: disable |
| SOS_1 | | x | x | x | 0 | x | x | x | x | x | x | x | x | x | x | x | x | 0: enable \| 1: disable |
| SSR_1 | | x | x | x | x | 0 | x | x | x | x | x | x | x | x | x | x | x | 0: enable \| 1: disable |
| SDIp | | x | x | x | x | x | 0 | x | x | x | x | x | x | x | x | x | x | 0: enable \| 1: disable |
| SDIn | | x | x | x | x | x | x | 0 | x | x | x | x | x | x | x | x | x | 0: enable \| 1: disable |
| Fault desc. | | x | x | x | x | x | x | x | 0 | x | x | x | x | x | x | x | x | 0? 1: Hard drive error |
| Func 8 | | x | x | x | x | x | x | x | x | 0 | x | x | x | x | x | x | x | 0: enable \| 1: disable |
| Func 9 | | x | x | x | x | x | x | x | x | x | 0 | x | x | x | x | x | x | 0: enable \| 1: disable |
| Func 10 | | x | x | x | x | x | x | x | x | x | x | 0 | x | x | x | x | x | 0: enable \| 1: disable |
| Func 11 | | x | x | x | x | x | x | x | x | x | x | x | 0 | x | x | x | x | 0: enable \| 1: disable |
| Func 12 | | x | x | x | x | x | x | x | x | x | x | x | x | 0 | x | x | x | 0: enable \| 1: disable |
| Func 13 | | x | x | x | x | x | x | x | x | x | x | x | x | x | 0 | x | x | 0: enable \| 1: disable |
| Func 14 | | x | x | x | x | x | x | x | x | x | x | x | x | x | x | 0 | x | 0: enable \| 1: disable |
| Func 15 | | x | x | x | x | x | x | x | x | x | x | x | x | x | x | x | 0 | 0: enable \| 1: disable |

| High byte | | | | | | | | Low byte | | | | | | | | Description |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | Bit |
|  |  |  |  |  |  |  |  | x | x | x | x | x | x | x | x | Data |
|  |  |  |  | x | x | x | x |  |  |  |  |  |  |  |  | Remaining data |
| 0 | 0 | 0 | 1 |  |  |  |  |  |  |  |  |  |  |  |  | WriteParameter mode |
| 0 | 0 | 1 | 0 |  |  |  |  |  |  |  |  |  |  |  |  | ReqParameter mode |
| 0 | 0 | 1 | 1 |  |  |  |  |  |  |  |  |  |  |  |  | ReadParameter mode |

FIG. 6

| High byte | | | | | | | | Low byte | | | | | | | | Description |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | Bit |
| 0 | 0 | 0 | 0 | 0 | 0 | 0 | 0 | 0 | 0 | 0 | 0 | 0 | 0 | 0 | 0 | no operation |

METHOD, COMMUNICATION SYSTEM AND SYSTEM FOR SECURE COMMUNICATION BETWEEN A MASTER AND A SLAVE OF A BUS SYSTEM

CROSS-REFERENCE TO RELATED APPLICATION

This application is a continuation, under 35 U.S.C. § 120, of copending International Patent Application PCT/EP2020/076392, filed Sep. 22, 2020, which designated the United States; this application also claims the priority, under 35 U.S.C. § 119, of German Patent Application DE 10 2019 215 115.9, filed Oct. 1, 2019; the prior applications are herewith incorporated by reference in their entirety.

FIELD AND BACKGROUND OF THE INVENTION

The invention relates to a method for secure communication between a master and a slave of a bus system. In the method, a telegram is exchanged between the master and the slave. The invention also relates to a communication system and to a system.

Industrial systems usually have a number of actuators, which are operated by using a process control system. In that case, each actuator is usually assigned a separate controller which is connected to the process control system by using a communication system, wherein a fieldbus protocol is normally used for the communication. Using the process control system, specifications are created for the actuator which are transmitted to the latter so that it is activated on the basis of the specifications. The status of the actuator is transmitted back to the process control system, so that the latter can be used for a further adaptation or matching to other actuators.

In addition to the process control system of the actuators, a safety control system is usually also present. That ensures that in the event of a malfunction or a situation in which a person may be injured or an object may be damaged, the actuator is stopped or can be operated only in a specific manner. For example, when a person approaches the actuator that is detected by a barrier opening or the like, and in that case the actuator is stopped. In particular, the safe function "STO" is executed. However, it is also possible that the actuator will continue to move, usually at a reduced speed. In that case it must be ensured that the speed of the actuator does not exceed a certain limit value.

In order to ensure at all times that the safe functions are actually activated, a separate bus system is usually formed, wherein the process control system forms the master of the bus system. The actuator, on the other hand, corresponds to a slave of the bus system. Since the communication between the master and the slave concerns safety-critical aspects, it is necessary that the communication between the master and the slave and the bus system thus formed satisfy a certain safety standard. It must thus be ensured that all telegrams exchanged between the master and the slave are actually received and processed correctly by the other device. FSoE ("Fail Safe over EtherCAT"), for example, is used for that purpose. In that fieldbus protocol, each telegram has a specific checksum or some other content that is based on the respective previous telegram. Thus, it is possible for both the master and the slave to verify that the correct telegram is currently being processed.

However, that method reduces the data exchange rate. For example, it is not possible for the master to send multiple telegrams to the slave consecutively. Instead, it is always necessary to wait for the response from the slave before a new telegram can be sent to it. In order to ensure that the actuator can still be operated relatively quickly in a safety-critical case, a data region of each telegram is encoded and has corresponding code blocks, in particular individual bits. Each of the code blocks is assigned a specific function. Therefore, if data are present in one of the code blocks, i.e., for example, the respective bit is set and thus has the value 1 ("one"), a function assigned to that main block is executed on the master or the slave. Thus, only a comparatively small number of data items is transmitted per telegram. However, in that case it is necessary to store the correct encoding of the data region in both the master and the slave before commissioning the industrial system. Subsequent changes thereto are no longer possible. In order to allow a corresponding change to be carried out, it is necessary to shut down the entire bus system and thus also the entire industrial system and to place both the master and the slave in a specific programming mode and change the encoding there.

SUMMARY OF THE INVENTION

It is accordingly an object of the invention to provide a particularly suitable method, a particularly suitable communication system and a particularly suitable system for secure communication between a master and a slave of a bus system, which overcome the hereinafore-mentioned disadvantages of the heretofore-known methods and systems of this general type and which, in particular, result in increased flexibility and a conveniently simplified operation and/or configuration.

With the foregoing and other objects in view there is provided, in accordance with the invention, a method for secure communication between a master and a slave of a bus system, in which a telegram is exchanged between the master and the slave, the telegram includes a first region and a second region, the first region contains a predefined instruction, and the second region is at least partially filled with a free instruction.

With the objects of the invention in view, there is also provided a communication system, which includes a bus system having a master and a slave and being operated in accordance with the method of the invention.

With the objects of the invention in view, there is furthermore provided a system, in particular an industrial system, having a communication system according to the invention.

Advantageous developments and embodiments form the subject matter of the dependent claims.

The method is used to provide secure communication between a master and a slave of a bus system. The bus system preferably satisfies a fieldbus standard and is therefore operated according to a fieldbus protocol. The bus system ideally supports a secure communication and therefore preferably has corresponding extensions. In this case, "Fail Safe over EtherCAT" (FSoE) is suitable for use as the bus system, or alternatively, Profinet. The master and the slave are linked to each other for signal transmission, for example by radio or, particularly preferably, by using a line of the bus system.

The method provides for a telegram to be exchanged between the master and the slave. For example, the master sends the telegram to the slave. Alternatively, the telegram is sent from the slave to the master, for example. Preferably, the slave does not create any telegrams independently. Rather, the telegram sent to the slave by the master is filled with suitable data by the slave.

The telegram has a specific structure and conveniently includes a header and/or a footer, which are used to describe a start or end of the telegram. A data region is preferably located in between them. The telegram, in particular the data region, has a first region and a second region. Thus, the data region, if present, is divided into at least the two regions, or has additional regions. The first region is separate from the second region and is directly adjacent to it, for example. The first region contains a predefined instruction. This means that the first region is encoded. In particular, the first region is only a single code block, and for example, only a single bit. In summary, provided the code block/predefined instruction is purely binary, for example, if a bit is set, for example, the predefined instruction is fulfilled, and if a bit is not set, the predefined instruction is not fulfilled. This means that a comparatively small amount of data is required. For example, if the first region is filled with data, the predefined instruction is fulfilled. If the first region contains no data, the predefined instruction is in particular not fulfilled. In other words, a binary form of the first region is preferred, wherein in one of the settings the predefined instruction is fulfilled and in the remaining setting of the first region the predefined instruction is not fulfilled. In summary, both the master and the slave have a stored record of which particular action is to be performed if the predefined instruction is fulfilled, in particular if data are stored accordingly.

The second region is at least partially filled, or at least can be filled, with a free instruction. Thus, it is possible to use the second region for formulating the free instruction. In this case, the slave or master first creates the respective free instruction and the other device reads it out. The free instruction can take different forms, although conveniently there are no restrictions on it. It is necessary for the slave and the master to first acquire and process the whole free instruction before a corresponding function can be executed, i.e. the free instruction can be implemented. The free instruction is formulated in particular in a specific programming language or other language. There are conveniently no restrictions on the free instruction, except that it must be formulated in the specific language. According to the method the telegram is therefore suitably created in such a way that it contains the first and the second region. In particular, the predefined instruction and the free instruction are subsequently processed by using the master or slave and, for example, a corresponding function and/or adjustment is carried out.

The method allows a secure operation of the slave. Since the predefined instruction exists in encoded form, only a comparatively small amount of data needs to be exchanged, which means that the telegram can be exchanged between the master and the slave relatively quickly. As a result, a high level of security is also maintained. Since the second region with the free instruction is also present, it is possible to respond, even during operation, to current requirements of the bus system, the master and/or the slave which were not known in advance, for example. It is also possible in this way to use the free instruction to represent special cases which only occur comparatively rarely. If these were integrated in the first region, i.e. were present in encoded form, the first region would be enlarged without the first region actually being used in most cases. However, since the second region is available, it is still possible to represent it with only a comparatively small first region being implemented. Thus, flexibility is increased and operation is also simplified. In addition, it is not necessary to store the free instruction in encoded form in the master and the slave beforehand, which simplifies configuration and also reduces the susceptibility to errors.

For example, the telegram also has additional regions. In the additional regions, for example, the possible footer and/or header are stored, as well as in particular certain instructions that are used for communication, but not for the execution of certain functions by the master/slave. In other words, the remaining region contains only data/instructions which are required and/or provided for the communication but not for the operation of the master/slave, for example so-called metadata.

The bus system is in particular a component of a communication system which conveniently includes additional components. The communication system itself is preferably a component of a system, for example an industrial system. In this case, the slave is conveniently assigned an actuator or at least a component of an actuator. The slave is appropriately used to receive specific instructions according to which the actuator is controlled, or at least performs certain functions. The instructions in this case are, in particular, the predefined instruction or the free instruction.

The predefined instruction is stored in both the master and the slave, in particular before commissioning of the bus system, so that in each of the two it is known how to respond to the presence of the predefined instruction, i.e. how a corresponding execution should function, or what function should be executed in this case. For example, the free instruction is only created when the bus system is in operation, i.e. when an initial configuration of the bus system has already been completed. Thus, its operation is simplified.

In particular, a plurality of such telegrams are exchanged between the master and the slave, preferably cyclically, in particular at certain fixed clock rates, wherein the clock rate is defined when the bus system is commissioned. The telegrams have the same structure and preferably the same length. Thus, each of the telegrams always includes the first region and the second region. The first region of each of the telegrams always includes the predefined instruction. The free instruction can differ between different telegrams, however. Due to the second region it is thus possible to exchange the free instruction between the master and the slave acyclically through the bus system, for which the cyclically exchanged telegrams are used. Due to the comparatively small first region, it is possible to use a comparatively short clock period. In particular, the telegrams are generated by the master, wherein the respective telegram is processed by using the slave, for example, and in particular is filled with corresponding data.

Preferably, the bus system includes a plurality of slaves, wherein, for example, the telegram is passed from the master to each of the slaves. Each slave is preferably assigned a first region, so that the telegram has as many first regions as there are slaves present. It is also convenient to assign a second region to each slave so that the telegram has exactly the same number of first and second regions, and wherein the number is equal to the number of slaves of the bus system. This simplifies the processing of the instructions by the slaves and reduces the susceptibility to error, which means security is increased.

For example, the free instruction is divided over a plurality of telegrams that are exchanged between the master and the slave. In other words, a portion of the free instruction is stored in the second region of each of the telegrams. The parts of the free instruction differ, and the free instruction therefore extends across the telegrams, namely the respective second region. This makes it possible to exchange even comparatively extensive or complex free instructions between the master and the slave without having to set a comparatively long length of the telegram. This reduces complexity and increases the data exchange rate between the master and the slave. In particular, the first region of the telegrams is always the same if the predefined instruction is to be executed in the same way. The telegrams therefore only differ in the second region, for example. In summary, by using the multiple telegrams the predefined instruction is therefore exchanged multiple times between the master and the slave, while the free instruction is exchanged only once.

The second region or another component of the telegram advantageously has a counter that is set depending on the number of telegrams, i.e. the number of telegrams over which the free instruction is or will be divided. For example, the counter is equal to the number of telegrams or is implemented with each new telegram exchanged. However, it is particularly preferred that the counter is initially set to the number of telegrams required to exchange the free instruction and is then reduced with each telegram exchanged. This means that it is clear to the master or slave how many further telegrams are yet to be exchanged until the free instruction has been completely exchanged. If a telegram with a different counter value is received, an error is identified and therefore no further secure exchange of the free instruction is possible. Thus, it is possible to detect error cases at a relatively early stage, so that no incorrect free instructions are processed. Security is thus further increased.

For example, the first region has only one predefined instruction. However, the first region particularly preferably includes multiple predefined instructions. In other words, multiple predefined instructions are used. For example, there are between 2 predefined instructions and 20 predefined instructions, between 5 predefined instructions and 15 predefined instructions, or between 8 predefined instructions and 10 predefined instructions. Each of the predefined instructions is appropriately assigned a code block of the first region, i.e. a data block, preferably 1 bit in each case. If the respective bit is set, the predefined instruction is fulfilled, meaning that it is to be executed. If the bit is not set, the predefined instruction should not be executed and/or is not fulfilled. Due to the multiple predefined instructions, flexibility is increased, with the number of predefined instructions being conveniently less than 20. Due to the comparatively small number, the programming effort required for storing/decoding the predefined instructions in both the master and the slave is reduced. Also, the amount of data exchanged between the master and the slave is not increased excessively.

It is particularly preferable that a checksum which is at least partly based on a previous telegram, in particular the immediately preceding telegram, is stored in the telegram. This makes it possible to determine the checksum separately in both the master and the slave since the previous telegram is known to both devices. It is thus possible to verify whether the telegram was transmitted without errors. The checksum is also conveniently based at least partly on the (current) telegram. In particular, the checksum corresponds to the sum of digits of a specific region, wherein, for example, a counter value is also used, the counter value being increased upon each telegram exchanged. For example, the checksum is assigned to the complete telegram. However, the first region particularly preferably contains the checksum, and the checksum is based at least partly on the last exchanged first region, which was exchanged by using the immediately preceding telegram. Alternatively, the second checksum is assigned to the second region and is at least partly based on the first or second region of the immediately preceding telegram.

Both the first and second regions are particularly preferably assigned such a checksum, and for example one component thereof each, which increases security. In a development, such a checksum is also assigned to the complete telegram which is thus transmitted by using the telegram, which again increases security. This is the case because if one of the checksums differs from the corresponding checksum determined separately by using the master or slave, an error is detected, which means that the communication is no longer secure.

For example, when the telegram is sent from the slave to the master and vice versa, the predefined instruction or the free instruction is filled with specific data which is generated by the actuator that may be present, for example. Those data are status data, for example. In this case, the predefined instruction corresponds in particular to predefined status data/an operating parameter of the actuator, for example the temperature.

A request to execute a safe function is particularly preferably used as the predefined instruction. In other words, the predefined instruction is the request to execute the safe function (safety function), particularly if the telegram is sent from the master to the slave. Examples of safe functions used are: "Safe torque off" (STO), "Safe stop ½" (SS½), "Safe Operation stop" (SOS), "Safely limited speed" (SLS), "Safe speed monitor" (SSM), "Safe speed range" (SSR), "Safe limited position" (SLP), "Safe position" (SP), "Safe direction" (SDI), and/or "Safe brake control/Safe brake test" (SBC/SBT). In other words, the predefined instruction is a request to execute the safety functions as described in particular in the IEC 61800-5-2:2007 standard.

Alternatively or in combination with this, a status with regard to the execution of a safe function is used as a predefined instruction, in particular a status query, if the telegram is sent from the master to the slave. If the telegram is sent from the slave to the master, the status of the safety functions in particular is transmitted, i.e. whether the slave is active or not. Both the master and the slave therefore store which safety function is described by using the predefined instruction. It is convenient in this case to have multiple predefined instructions available, each of which is a safety function. This makes it possible, for example, to have the slave execute certain safety functions at the instigation of the master. This increases safety and simplifies operation.

Alternatively, or particularly preferably in combination with this, the slave is configured using the free instruction. In this case, the instruction is transferred from the master to the slave by using the telegram. In other words, the parameter is sent from the master through the second region of the telegram, and in particular an appropriate adjustment is then carried out by using the slave.

For example, the free instruction is used to specify which of the possible safety functions should be executed if the predefined instruction contains the request to execute the safety function. Preferably, the free instruction is in the form of a request to adjust a parameter of the possible safe function. If, for example, the "Safely limited speed" safety function is used as the predefined instruction, it is possible to use the free instruction to adjust the speed to which the actuator is regulated in accordance with the "Safely limited speed" safety function, if this is active. The activation conveniently takes place by using the predefined instruction, i.e. by using the first region. In other words, the free instruction is used to adjust the function that is triggered by the predefined instruction. Since the adjustment is applied to the safe function, which is controlled in particular by using the predefined instruction, it is also possible to perform the initial configuration of the bus system or any actuator that may be present using the free instruction. A default setting is conveniently used for the initial commissioning, and thereafter an appropriate configuration of the slave is carried out by using the free instruction. In summary, it is therefore possible to configure the bus system, in particular the system that may be present, after initial commissioning and during operation.

Alternatively, or particularly preferably in combination with this, a query of an operating parameter is used as the free instruction, in particular if the telegram is sent from the master to the slave. If the telegram is sent from the slave to the master, the free instruction is filled in particular with the operating parameter. A specific time of the operating parameter is also suitably specified so that by using a number of such free instructions a time series of the operating parameter can be read out. For example, the set of operating parameters is predefined, so that the free instruction specifies the respective operating parameter. For example, a specific address or the like is transferred by using the free instruction, or the address is a component of the free instruction. The respective operating parameter in this case is stored at the address. Thus it is possible to monitor the slave and the actuator preferably operated with it comparatively accurately.

The free instruction is particularly preferably verified by the slave, in particular if the instruction was sent from the master to the slave. Only following this, in particular, is the free instruction appropriately implemented, i.e. executed. For example, any setting transferred by using the free instruction is checked and compared with certain specifications. Only if these are satisfied, in particular, is the corresponding setting adjusted. Thus an incorrect configuration of the slave by the master is prevented by using the free instruction. For the predefined instruction, conveniently no verification is carried out, that is, it is not checked whether the predefined instruction should be executed at the current time, in particular, whether it is safe to execute the predefined instruction. Since the predefined instruction is predefined and thus stored in the telegram in encoded form, an incorrect interpretation is not possible. In other words, it is not possible to execute the predefined instruction incorrectly. Since no verification is performed, however, the processing, i.e. execution, of the predefined instruction is accelerated.

The communication system has a bus system with one master and one slave. In particular, the master and the slave are coupled/connected to each other for signal transmission, for example by using a physical cable or wirelessly, for example by using radio. In particular, the signal-transmission coupling, i.e. the bus system, complies with a particular standard, for example a fieldbus standard, such as Ethercat. The master and/or the slave conveniently has a control unit. The master and/or the slave are configured identically or preferably differ only in their configuration. However, the hardware of the master and the slave is preferably the same, which means that identical parts can be used.

The communication system is operated according to a method for secure communication between the master and the slave. In the method, a telegram is exchanged between the master and the slave. The telegram has a first region and a second region. The first region contains a predefined instruction and the second region is at least partially filled with a free instruction. In summary, the communication system is configured in particular for secure communication in accordance with this method. The telegram is thus appropriately created by the master or slave. The communication system preferably includes a control unit by using which the method is carried out. In particular, the control unit is implemented at least partially by using the control unit of the master and/or slave, so that these together in particular form the control unit of the communication system. The control unit or units include a microprocessor, for example, which is suitably programmable, and/or an application-specific integrated circuit (ASIC). Preferably, the production system has a plurality of such slaves, wherein each of the slaves is conveniently allocated a first region and a second region of the telegram.

The communication system is particularly preferably a component of a system through the use of which a specific function is implemented. The system is conveniently an industrial system. The industrial system is preferably used to produce and/or process a workpiece, for which an actuator is used. For example, the actuator is operated with a comparatively high power output, which is in particular greater than 100 W, 500 W, 1 kW, 5 kW, 10 kW or 20 kW. The communication system is preferably used to enable the actuator to communicate with a safety control system. In particular, the safety control system includes the master. The actuator preferably forms the slave, at least in some cases. The system is suitably equipped with a plurality of such actuators, each of which forms a slave or each actuator is assigned at least one such slave.

The system conveniently provides a specific function and preferably has a controller and an actuator, which in particular are connected to each other for signal transmission by using a communication system. The communication system has a bus system including both a master and a slave. The master is, for example, a component of the controller or is at least connected to it for signal transmission and operated by using it in a suitable manner. The actuator in particular includes the slave and/or is controlled by the latter. The system is an industrial system, for example, and is therefore used for the processing and/or production of a specific workpiece. The system preferably has a plurality of slaves, each of which is assigned to one actuator. The actuators are used, for example, to process the workpiece at the same time, or the actuators are operated independently of each other. The communication system is operated according to a method for secure communication between the master and the slave, in which a telegram is exchanged between the master and the slave. The telegram has a first region and a second region. The first region contains a predefined instruction, and the second region is at least partially filled with a free instruction.

The developments and advantages mentioned in connection with the method are also intended to be transferred mutatis mutandis to the communication system/system and to each other, and vice versa.

Other features which are considered as characteristic for the invention are set forth in the appended claims.

Although the invention is illustrated and described herein as embodied in a method, a communication system and a system for secure communication between a master and a slave of a bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
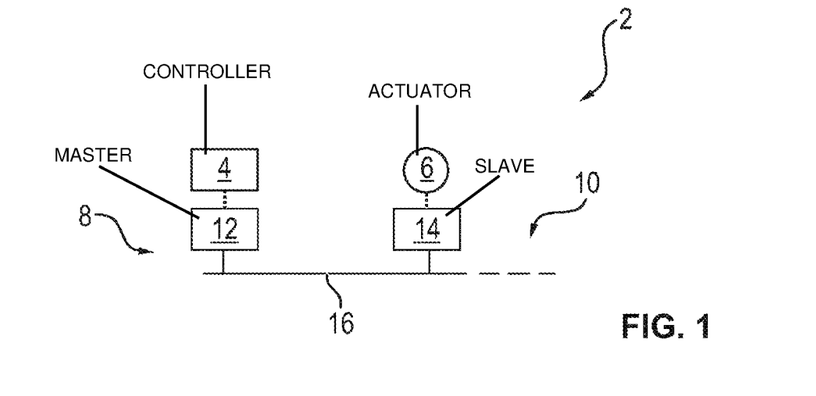
FIG. 1 is a block diagram of an industrial system with a communication system including a master and a slave.

Referring now in detail to the figures of the drawings, in which equivalent parts are provided with the same reference symbols, and first, particularly, to FIG. 1 thereof, there is seen a simplified block diagram of an industrial system 2 which has a controller 4 and an actuator 6. The actuator 6 is a machine axle or a robot arm, and in operation the actuator 6 is used to process a workpiece, not shown in detail. The industrial system 2 has additional actuators, not shown in detail, which are also used to process the workpiece, for example simultaneously with the actuator 6 or following or preceding it.

The actuator 6 is operated according to the required process parameters by using the controller 4, which is a programmable logic controller. The controller 4 is located in a control panel or the like and is located at a distance from the actuator 6. The controller 4 and the actuator 6 are connected to each other by a communication system 8, which has a bus system 10. The bus system 10 complies with the FSoE standard ("Fail Safe over Ethercat").

The bus system 10 has a master 12 and a slave 14, which are connected for signal transmission through a line 16 of the bus system. In this case, the master 12 is assigned to the controller 4 and the slave 14 is assigned to the actuator 6. For communication purposes, a corresponding request from the controller 4 is fed into the bus system 10 through the master 12 and received through the slave 14. The actuator 6 is controlled in accordance with the requests thus transmitted. The bus system 10 has additional slaves which are configured in the same way as the slave 14, each slave being assigned to one of the remaining actuators.

Figure 2:
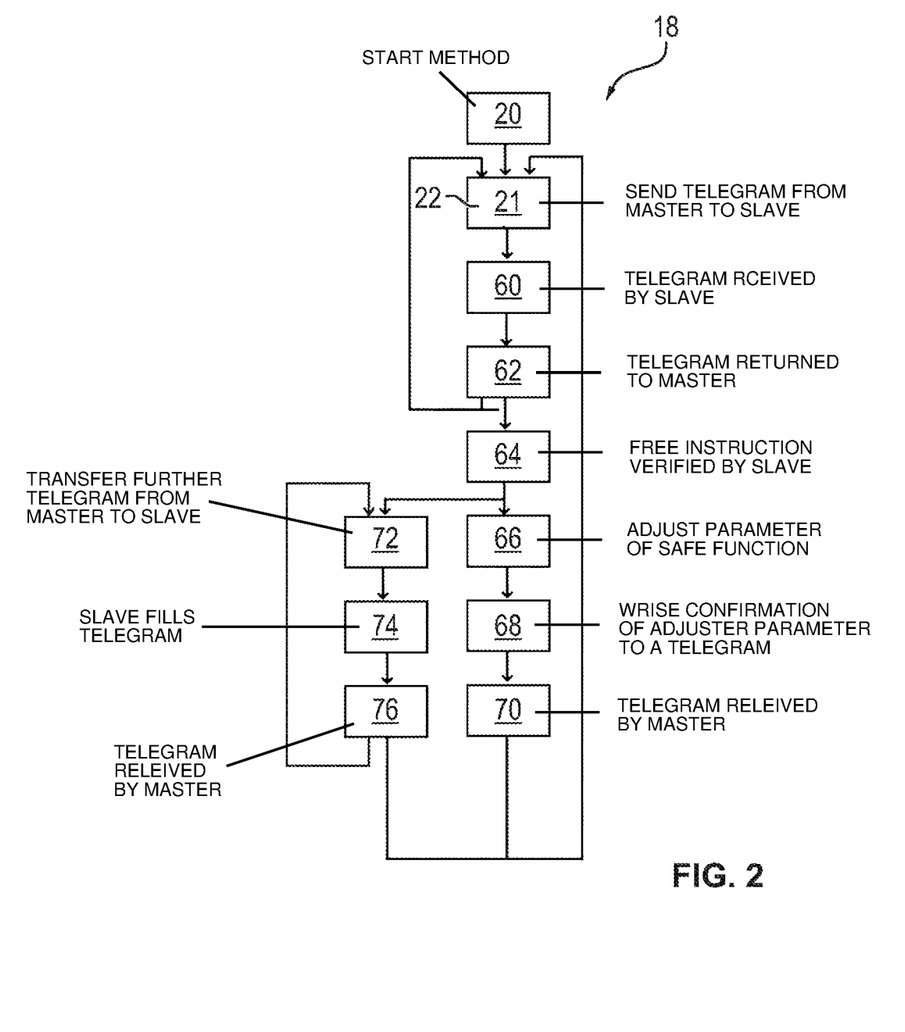
FIG. 2 is a flow chart of a method for secure communication between the master and the slave.

FIG. 2 shows a method 18 for secure communication between the master 12 and the slave 14 as well as any further slaves present. The method 18 is implemented using the master 12 and the slave 14 and is therefore used for the operation of the communication system 8. In a first process step 20 the method 18 is started. In a second process step 21, a telegram 22 is then sent from the master 12 to the slave 14 over the line 16.

Figure 3:
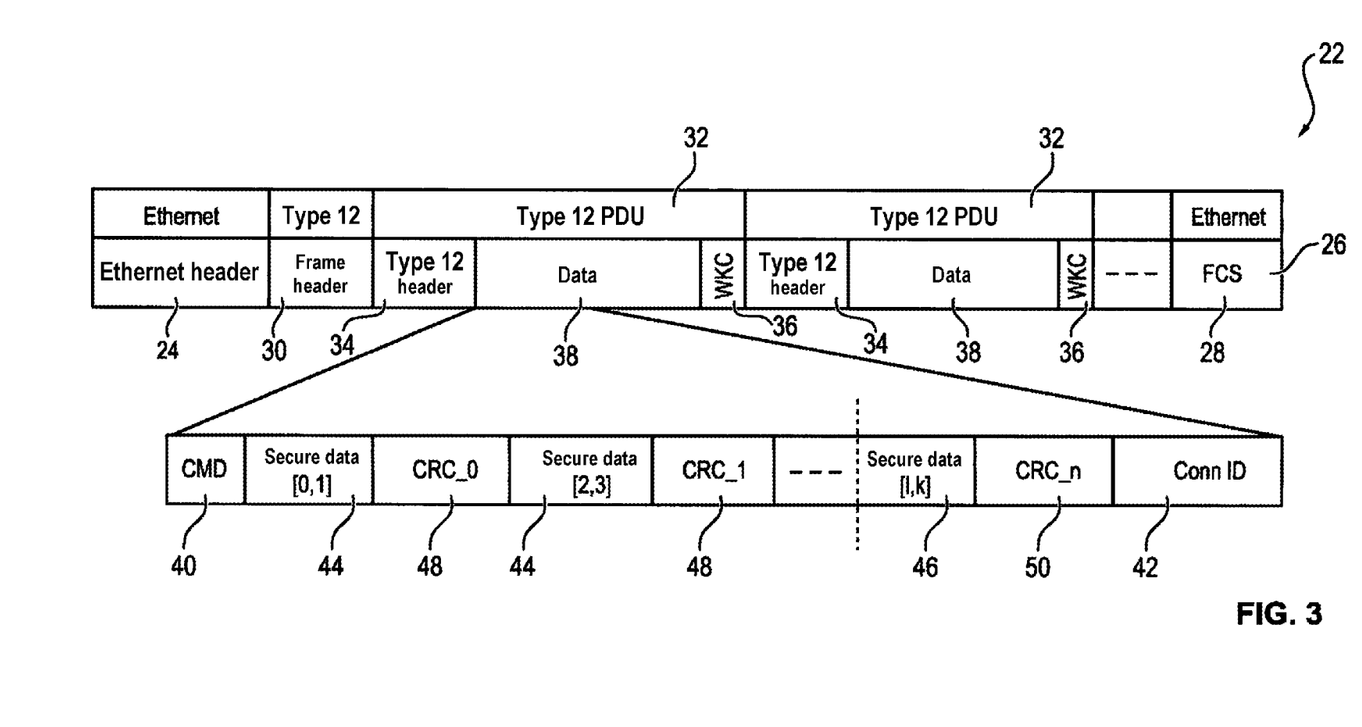
FIG. 3 is a block diagram showing the structure of a telegram which is exchanged between the master and the slave and which has multiple first regions and a second region.

FIG. 3 shows the schematic structure of the telegram 22, wherein the structure of all telegrams that are exchanged between the master 12 and the slave 14, i.e. fed into the bus system 10, is the same and they also have the same length. The telegram 22 has a header 24 which indicates the start of the telegram 22. The telegram 22 ends with a footer 26, which contains a checksum 28. The checksum 28 is a CRC checksum and is at least partly based on a previous telegram, namely the checksums 28 stored there. This is increased by a factor of 1, and in this case also the sum of digits of the other components of the telegram 22 is used to create the current checksums 28. If no previous telegram has been exchanged, the value "0" (zero) or a predefined value is used for the start value instead of the previous checksums 28. The header 24 and the footer 26 are necessary in order to comply with the Ethernet standard on which Ethercat is based.

The header 24 is followed by a further header 30, which specifies that the telegram 22 satisfies the Ethercat standard. Between the additional header 30 and the footer 26, data regions 32 are disposed, which each have the same structure and begin with an additional header 34. The additional header 34 specifies that the telegram 22 or at least the data region 32 satisfies the FSoE standard. Each of the slaves of the communication system 8 is assigned one data region 32.

Each data region 32 has an end region 36, which is a so-called "working counter" (WKC). Between the additional header 34 and the end region 36, a further data region 38 is disposed, which is therefore a component of the data region 32. The end region 36, the WKC, stores whether the respective additional data region 38 has been processed correctly, i.e. read or written, for example.

Each additional data region 38 begins with a control specification 40 (CMD) and ends with an identification number 42 (Conn ID). In between there are a plurality of first regions 44 and a second region 46. Each first region 44 is followed by a first checksum 48, which is determined in each case from the first region 44 preceding it and the first checksums 48 of the immediately preceding telegram, which is located at the same position in the immediately preceding telegram. The second region 46 is assigned a second checksum 50 which is determined in the same way, and is therefore also based on the second checksum of the immediately preceding telegram and the second region 46. The first checksums 48 and the second checksums 50 are again CRC values.

Figure 4:
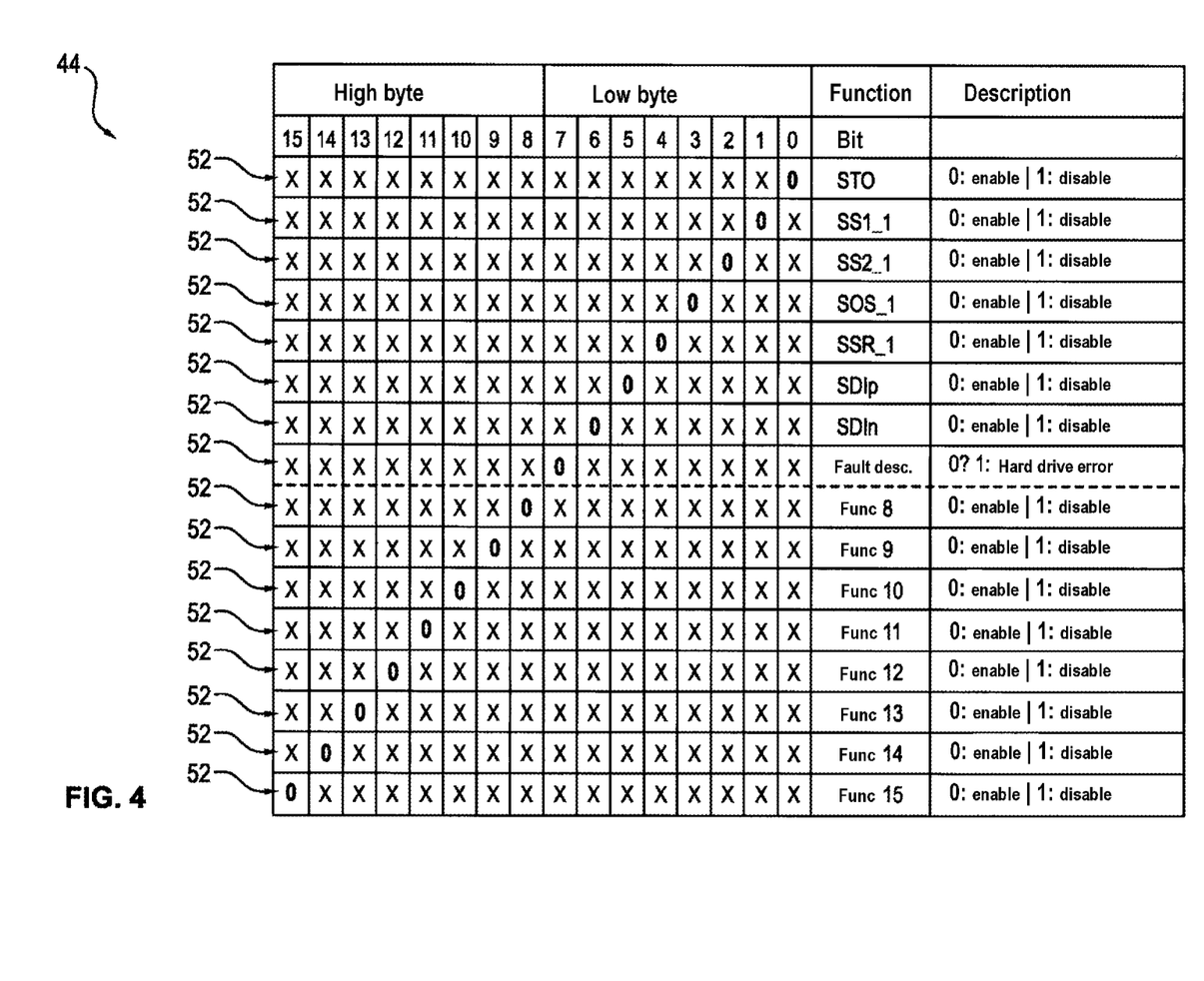
FIG. 4 is a diagram showing the structure of one of the first regions.

FIG. 4 shows the schematic structure of one of the first regions 44. The first region 44 has a total of 2 bytes and thus 16 bits. Each bit corresponds to a predefined instruction 52. Thus, the zero-th bit, i.e. the first predefined instruction 52, if this is set, is a request to execute a safe function, namely STO (Safe torque off). The first bit is the request to execute the safe function SS1, the second bit is the request, if this is set, to execute the safe function SS2. The 8th bit up to the 15th bit are also assigned safety functions. Thus, in each first region 44 a plurality of predefined instructions 52 are present.

If the telegram 22 is sent from the master 12 to the slave 14, the predefined instruction 52 is the request to execute the respective safe function. In other words, the slave 14 should cause the actuator 6 to execute the respective safe function if the bit is set there, i.e. the value 1 ("one") is located there. Thus, the slave 14 should execute the safe function SOS (Safe operation stop) if the third bit is set. If the telegram 22 is sent from the slave 14 to the master 12, the status with regard to the execution of the safe function is used as the predefined instruction 52. This means that the slave 14 sets the respective bit if the respective safe function is executed. Thus, if the safe function SSR (Safe speed range) is executed by the slave 14 or the assigned actuator 6, the fourth bit is set by the slave 14. In summary, in the first region 44, the predefined instructions 52 are present in encoded form.

Figure 5:
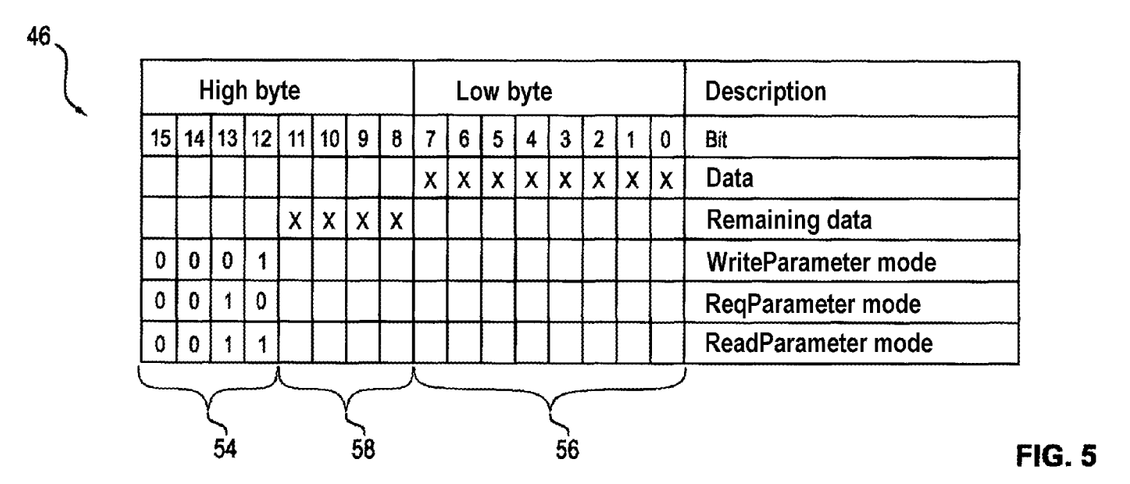
FIGS. 5 and 6 are diagrams showing the structure of the second region.

The second region 46 is shown schematically in FIG. 5. This also has 2 bytes and thus 16 bits. The 12th-15th bits correspond to a control region 54. The control region 54 is used to define how to proceed with a free instruction 56 which extends from the zero-th bit to the 7th bit. It is thus possible, given an appropriate configuration of the control region 54, i.e. depending on the set bit, that the free instruction 56 is the request to write a parameter. In particular, one of the safe functions is adjusted and thus the parameter is adjusted to a safe position. In this way, in the case of the safe function SOS it is possible to specify the safe position, which is therefore a parameter of the safe function. The respective safe position, the parameter, and the new value are each specified by using an appropriate formulation of the free instruction 56, for which the corresponding bits are set. The free instruction 56 is filled using a corresponding programming language or, for example, ASCII code.

In another setting of the control region 54 in which only the 13th bit is set, an operating parameter is queried, the operating parameter being specified by using the free instruction 56. It is thus possible, for example, to query the safe position of the safe function SOS. In one embodiment the operating parameter is selected from a specific number of possible parameters corresponding to the respective actuator 6 as well as the parameters of the safe functions. Therefore, it is not necessary to write a relatively complex query in the free instruction 56, rather it is sufficient to specify the corresponding address of the operating parameter.

In the two configurations of the control region 54 mentioned above, the free instruction 56 is created using the master 12. If the operation parameter is queried by the master 12 and a corresponding response is executed by the slave 14, the control region 54 is modified and the 12th and 13th bits are set there, so that it is clear that the free instruction 56 was filled by the slave 14. The second region 46 also has a counter 58 which corresponds to the 8th-11th bits.

In a third process step 60, shown in FIG. 2, the telegram 22 is received by the slave 14. The first regions 40 and the second region 46 are read out. In addition, the predefined instructions 52 are processed in the third process step 60. In this case, if the predefined instructions 52, i.e. the respectively assigned bits, are set to "0" (zero), none of the safe functions is activated. It is also checked whether a safe function is currently being executed on the slave 14 or the actuator 6.

In a subsequent fourth process step 62, the telegram 22 is returned to the master 12, wherein the information that the telegram 22 was received correctly is stored. The status of the safe functions determined in the third process step 60 is also transmitted. Thus, if one of the safe functions is active, the bit corresponding to this safe function in the first region 44 of the returned telegram 22 is set to "1" (one).

If the free instruction 56 is relatively complex, the second region 46 of a telegram 22 is not sufficient to accommodate it completely.

Therefore, the master 12 divides the free instruction 56 over multiple telegrams 22, which are sent consecutively to the slave 14. Thus, after the fourth process step 62, if the free instruction 56 is not yet complete, the second process step 21 is carried out again, the content of the second region 46 being modified accordingly. The counter 58 is used to specify that the free instruction 56 is distributed over multiple telegrams 22. The 8th-11th bits of the second region 46 are set to the number of following telegrams 22 which are still required until the free instruction 56 is completed. Thus, the counter 58 is decremented and the second to fourth process steps 21, 60, 62 are also carried out until the counter 58 reaches zero ("0"). In summary, a plurality of telegrams 22 are exchanged between the master 12 and the slave 14, wherein the free instruction 56 is divided over the plurality of telegrams 22. The counter 58 of the second region 46 is used to specify the number of telegrams 22 required to complete the free instruction 56, and the counter 58 is therefore set depending on the number of telegrams 22.

If the free instruction 56 is complete, i.e. if the free instruction 56 was transmitted by using only a single telegram 22, or all telegrams 22 that contain the free instruction 56 have been transmitted, a fifth process step 64 is carried out. In the fifth process step 64, the free instruction 56 is verified by the slave 14. In this case, a check is made as to whether the free instruction 56 is compatible with other conditions stored in the slave 14 and, in particular, whether safe operation of the actuator 6 is also possible. In particular, it is checked whether the safe position is within a permitted range if the safe position of the safe function SOS is to be changed using the free instruction 56. If this is the case, a sixth process step 66 is carried out if it was specified using the control regions 54 that one of the parameters of the safe function is to be adjusted. In the sixth process step 66, the corresponding parameter of the safe function is then adjusted in line with the free instruction 56. In a subsequent seventh process step 68, the confirmation that the parameter has been adjusted is written to a subsequent telegram 22 as a free instruction 56. In a subsequent eighth process step 70, this telegram 22 is received by the master 12. This is followed by the second process step 21 once again.

If in the free instruction 56 that was transferred from the master 12 to the slave 14 it was specified by using the control region 54 that a certain operating parameter is queried, a ninth process step 72 is carried out. In this step, a further telegram 22 is transferred from the master 12 to the slave 14, wherein the control region 54 specifies that the free instruction 56 is kept free for filling by the slave 14. In a subsequent tenth process step 74, the telegram 22, namely the second region 46, is filled accordingly by the slave 14. In this case, the requested operating parameter is written in the zero-th to seventh bits and is therefore used as a free instruction 56. In a subsequent eleventh process step 76, the telegram 22 is received by the master 12.

If the operating parameter or some other response of the slave 14 is comparatively extensive, the second region 46 might not be sufficient for it. In this case also, the free instruction 56, in particular the response of the slave 14, like the operating parameter, is divided over multiple such telegrams 22, wherein the control region 54 is always the same and specifies that filling will be carried out by the slave 14. The counter 58 is also used. Since in the master 12 the size of the requested operating parameter or the size of the response to be expected from the slave 14 is known, the counter 58 is set accordingly by the master 12 and the remaining section of the second region 46 is filled by the slave 14 according to the request. This, that is, the ninth, tenth and eleventh process steps 72, 74, 76, is carried out until the free instruction 56 is complete. Directly thereafter, the second process step 21 is carried out again.

Figure 6:
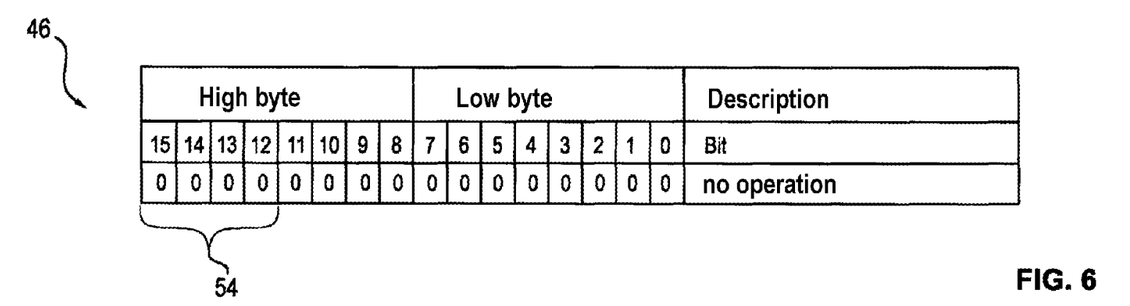

With the method 18, telegrams 22 are thus exchanged between master 12 and slave 14, wherein the exchange takes place cyclically. The bus system 10 is operated with a specific clock rate, wherein a corresponding telegram 22 is fed into the bus system 10 at the beginning of each clock cycle. If no free instruction 56 is present, i.e. if there is no corresponding request from the master 12 to the slave 14 or no corresponding response, the second region 46 is completely filled with zeros, as shown in FIG. 6. It is thus specified that no free instruction 56 exists or that at least no corresponding activity should take place. This is shown in particular by the fact that the 12th-15th bits are set to zero, i.e. the control region 54 contains only zeros. On the basis of the method 18 it is therefore possible to use the free instruction 56 in the cyclically operated bus system 10 in an acyclic manner, in which the predefined instructions 52 are transferred cyclically.

The invention is not limited to the exemplary embodiment described above. Instead, other variants of the invention can also be derived from them by the person skilled in the art, without departing from the subject-matter of the invention. In particular, all individual features described in connection with the exemplary embodiment can also be combined together in different ways without departing from the subject matter of the invention.

The following is a summary list of reference numerals and the corresponding structure used in the above description of the invention.

LIST OF REFERENCE SIGNS 2 industrial system
4 controller
6 actuator
8 communication system
10 bus system
12 master
14 slave
16 line
18 method
20 first process step
21 second process step
22 telegram
24 header
26 footer
28 checksum
30 additional header
32 data region
34 additional header
36 end region
38 additional data region
40 control specification
42 identification number
44 first region
46 second region
48 first checksum
50 second checksum
52 predefined instruction
54 control region
56 free instruction
58 counter
60 third process step
62 fourth process step
64 fifth process step
66 sixth process step
68 seventh process step
70 eighth process step
72 ninth process step
74 tenth process step
76 eleventh process step

The invention claimed is:

1. A method for secure communication between a master and a slave of a bus system, the method comprising:
exchanging a telegram between the master and the slave;
providing the telegram with a first region and a second region;
providing a predefined instruction in the first region;
using at least one of a request to execute a safe function or a status regarding an execution of a safe function, as the predefined instruction; and
at least partially filling the second region with a free instruction.

2. The method according to claim 1, which further comprises exchanging a plurality of telegrams between the master and the slave, and dividing the free instruction over the telegrams.

3. The method according to claim 2, which further comprises setting a counter of the second region depending on a number of the telegrams.

4. The method according to claim 1, which further comprises using a plurality of predefined instructions.

5. The method according to claim 1, which further comprises storing in the telegram a checksum at least partly based on a previous telegram.

6. The method according to claim 1, which further comprises using as the free instruction at least one of a request to adjust a parameter of a safe function or a query of an operating parameter selected from a predetermined set of operating parameters.

7. The method according to claim 1, which further comprises using the slave to verify the free instruction.

8. A communication system, comprising a bus system having a master and a slave and being configured to operate in accordance with the method of claim 1.

9. A system or an industrial system, comprising a communication system according to claim 8.

10. The method according to claim 1, which further comprises using the master and the slave to acquire the free instruction, and subsequently processing the predefined instruction and the free instruction.

11. The method according to claim 1, which further comprises providing the telegram with a data region being divided into at least the first and second regions, and the first and second regions being separate from and adjacent to each other.

* * * * *